(12) United States Patent
Hickman (10) Patent No.: US 7,043,964 B1
(45) Date of Patent: May 16, 2006

(54) METHOD AND SYSTEM FOR DETECTING LEAKS IN A PLUGGED HONEYCOMB STRUCTURE

(75) Inventor: David L. Hickman, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/018,741

(22) Filed: Dec. 20, 2004

(51) Int. Cl.
*G01M 3/04* (2006.01)

(52) U.S. Cl. .......................................... 73/40.7; 374/5
(58) Field of Classification Search ................ None
See application file for complete search history.

(56) References Cited

U.S. PATENT DOCUMENTS

| | | | |
|---|---|---|---|
| 3,791,194 A | * | 2/1974 | Pontello ........................ 374/4 |
| 5,102,434 A | | 4/1992 | Hijikata et al. |
| 5,540,691 A | * | 7/1996 | Elstrom et al. ................ 606/64 |
| 6,301,097 B1 | * | 10/2001 | Ellsworth et al. ........... 361/679 |
| 2004/0000186 A1 | * | 1/2004 | Hagg et al. .................... 73/38 |
| 2004/0003914 A1 | * | 1/2004 | Avila ......................... 165/11.1 |

\* cited by examiner

*Primary Examiner*—Hezron Williams
*Assistant Examiner*—Paul M. West
(74) *Attorney, Agent, or Firm*—Kees van der Sterre (57) ABSTRACT

A method for detecting leaks in a plugged honeycomb structure includes directing a gas at a first end face of the honeycomb structure at a temperature that is different from a temperature of the honeycomb structure and observing a temperature distribution at a second end face of the honeycomb substrate using an infrared detector, wherein the gas directed at the first end face of the honeycomb structure emerges preferentially at the second end face of the honeycomb structure at locations where the cells in the honeycomb structure are defective and appear as thermal spots in the temperature distribution.

18 Claims, 6 Drawing Sheets

METHOD AND SYSTEM FOR DETECTING LEAKS IN A PLUGGED HONEYCOMB STRUCTURE

FIELD OF THE INVENTION

The invention relates to particulate filters and to methods of detecting leaks in particulate filters that may affect the filtration efficiencies of the filters.

BACKGROUND OF THE INVENTION

Figure 1:
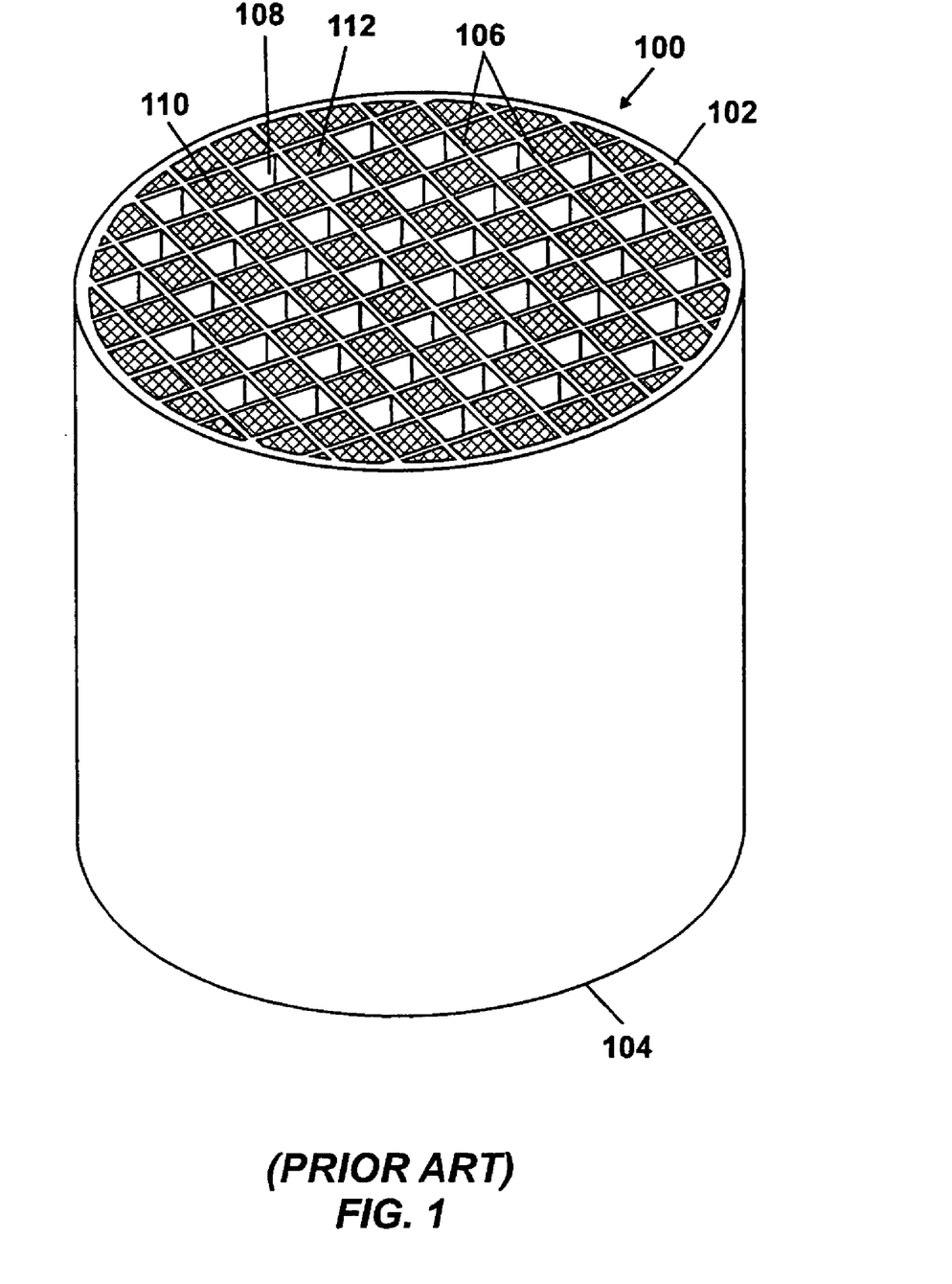
FIG. 1 shows a prior-art honeycomb filter.

Wall-flow honeycomb filters are typically used to remove carbonaceous solid particulates from diesel engine exhausts. The honeycomb filter is typically extruded from ceramic precursors mixed with pore forming material. The pore forming material is burned out when the ceramic precursors are fired to produce the hardened ceramic body. FIG. 1 shows a typical wall-flow honeycomb filter 100 having an inlet face 102, an outlet face 104, and an array of interconnecting porous walls 106 extending longitudinally from the inlet face 102 to the outlet face 104. The interconnecting porous walls 106 define a grid of inlet channels (or cells) 108 and outlet channels (or cells) 110. Plugs 112 are inserted in the outlet channels 110 where the outlet channels adjoin the inlet face 102. Plugs (invisible in the drawing) are also inserted in the inlet channels 108 where the inlet channels 108 adjoin the outlet face 104. Thus, the outlet channels 110 are open where they adjoin the outlet face 104, and the inlet channels 110 are open where they adjoin the inlet face 102.

In a typical cell structure, each inlet cell 108 is bordered on all sides by outlet cells 110 and vice versa. The cells 108, 110 may have a square cross-section as shown. Other cell geometries such as triangle and hexagon are also known. Honeycomb filters having cellular densities between about 10 and 300 cells/in$^2$ (about 1.5 to 46.5 cells/cm$^2$), more typically between about 100 and 200 cells/in$^2$ (about 15.5 to 31 cells/cm$^2$), are considered useful to provide sufficient thin wall surface area in a compact structure. Wall thickness can vary upwards from the minimum dimension providing structural integrity of about 0.002 in. (about 0.05 mm), but is generally less than about 0.060 in. (1.5 mm) to minimize filter volume. A range of between about 0.010 and 0.030 in (about 0.25 and 0.76 mm), e.g., 0.019 in., is most often selected for these materials at the preferred cellular densities.

The honeycomb filter 100 may be installed in a shell, which may then be inserted into the exhaust system of a vehicle equipped with a diesel engine. In operation, diesel exhaust directed at the inlet face 102 of the honeycomb filter 100 flows into the inlet channels 108. The interconnected porous walls 106 are provided with an internal interconnected open porosity that allows the exhaust to pass from the inlet channels 108 to the outlet channels 110 while restraining a desired portion of the solid particulates in the exhaust. The filtered exhaust exits the filter through the outlet channels 110.

Filtration efficiencies up to and in excess of 90% by weight of the diesel exhaust particulates can be achieved with honeycomb filters such as described above. However, the filtration efficiency achievable can be dramatically reduced if there are leaks in the honeycomb filter due to defects, such as holes and cracks, in the interconnecting porous walls and plugs in the filter. Thus in the production of honeycomb filters for diesel particulate filtration, it is customary to test the honeycomb filters for leaks. If leaks are found, the defects causing the leaks are plugged, and the test may be repeated until the results are satisfactory. The test may be performed while the honeycomb structure is still green or after firing the honeycomb structure. In general, it is easier to repair defects while the honeycomb structure is still green.

One prior-art method for identifying leaks in a plugged honeycomb filter involves taping a clear film to one end of the honeycomb structure and pouring graphite into the opposite end of the honeycomb structure while rotating the honeycomb structure about two axes. Defective cells having voids within their walls or plugs allow the graphite particles to pass through and are detected by presence of the graphite particles on the clear film. Variations of this method include replacing the graphite particles with other particles, such as micro glass and plastic beads.

Another prior-art method for identifying leaks in a plugged honeycomb filter is disclosed in U.S. Pat. No. 5,102,434 (Hijikata et al.). This method involves flowing a gas containing solid particulates, such as carbon soot, under pressure into one end of the honeycomb structure. A gas-permeable screen is placed adjacent the other end of the honeycomb structure to collect solid particulates from the gas flowing out of the honeycomb structure. The screen is inspected for patterns differing from the defect-free structure.

The methods described above require fired plugged honeycomb structures and do not reliably detect defects in cases where the solid particulates are too big to flow through the defects. In cases where graphite particles are used for testing, small amounts of graphite particles remain inside the honeycomb structure after testing, which can interfere with the downstream processing of the honeycomb structure, such as catalyst coating process. Further, additional steps are required to clean and remove the solid particulates used for testing from the filter.

Another prior-art method for identifying leaks in a plugged honeycomb filter involves securing a heat sensitive film (liquid crystal) to one end of a honeycomb filter. The heat sensitive film is initially heated. Cold air is blown from the opposite end of the filter to the film. The air that passes uninhibited through the voids and cracks within the walls of the filter cools the films at the location of the defective cells. This method is suitable for inspecting green plugged honeycomb filter.

SUMMARY OF THE INVENTION

In one aspect, the invention relates to a method for detecting leaks in a plugged honeycomb structure which comprises (a) directing a gas at a first end face of the honeycomb structure at a temperature that is different from a temperature of the honeycomb structure and (b) detecting infrared emissions at a second end face of the honeycomb structure, the infrared emissions being representative of a temperature distribution at a second end face of the honeycomb structure, wherein the gas directed at the first end face of the honeycomb structure emerges preferentially at the second end face of the honeycomb structure at locations where the cells in the honeycomb structure are defective and appears as thermal spots in the temperature distribution.

In another aspect, the invention relates to a system for detecting leaks in a plugged honeycomb substrate which comprises (a) a holder which supports the honeycomb structure, (b) a gas conditioner positioned to direct gas at a first end face of the honeycomb structure at a temperature that is different from a temperature of the honeycomb structure, and (c) an infrared detector positioned to detect infrared emissions at a second end face of the honeycomb structure, the infrared emissions being representative of a temperature distribution at the second end face of the honeycomb structure.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Embodiments of the invention provide a method and system for detecting leaks in a plugged honeycomb structure. The method generally involves directing a gas at a first end of the honeycomb structure at a temperature different from the initial temperature of the honeycomb structure. The method also involves observing a temperature distribution at a second end of the honeycomb structure using an infrared detector. For an unfired or "green" honeycomb, if there are no leaks in the honeycomb structure, the gas passed into the first end of the honeycomb structure will not emerge at the second end of the honeycomb structure. In the case a fired, porous honeycomb, the gas will emerge, but will emerge uniformly across the second end of the structure. In either case, the temperature distribution at the second end of the honeycomb structure will appear uniform. However, if there are leaks in the honeycomb structure due to defects in the walls or plugs of the cells in the honeycomb structure, the gas passed into the first end of the honeycomb structure will emerge selectively or non-uniformly at the second end of the honeycomb structure. The gas emerging at the second end of the honeycomb structure would appear as thermal spots (hot or cold spots) on the temperature distribution. These thermal spots can be used to reliably identify the defective cells in the honeycomb structure since their locations will correspond to the locations of the defective cells. The defective cells may then be repaired. Thus the method of the invention is effective in detecting defects in "green" plugged honeycombs as well a porous or fired honeycombs.

Figure 2A:
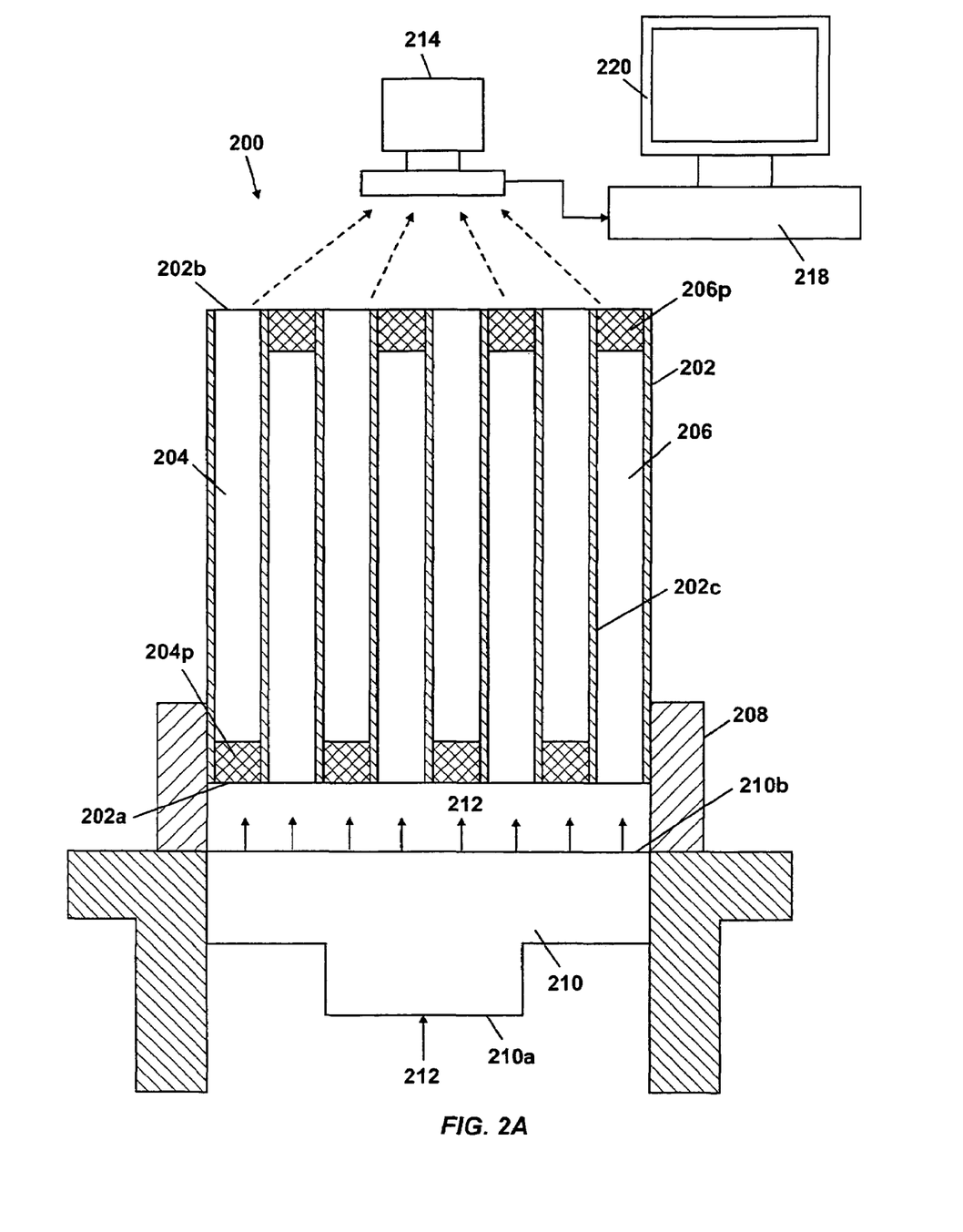
FIG. 2A illustrates a system for detecting leaks in a plugged honeycomb structure according to one embodiment of the invention.

FIG. 2A is a schematic of a system 200 for detecting leaks in a plugged honeycomb structure 202 according to one embodiment of the invention. The plugged honeycomb structure 202 may be extruded from ceramic precursors, such as cordierite or silicon carbide, mixed with pore formers, such as graphite or cellulosic materials. The ceramic precursors can be fired to burn out the pore formers and form a solid ceramic body. The solid ceramic body can be inserted in a shell and used as a solid particulate filter in, for example, the exhaust system of a diesel engine. The honeycomb structure 202 has end faces 202a, 202b and interior walls 202c extending between the end faces 202a, 202b. The walls 202c define cells 204, 206. Plugs 204p, 206p are inserted in the ends of the cells 204 adjoining the end face 202a and the ends of the cells 206 adjoining the end face 202b, respectively. The ends of the cells 204 adjoining the end face 202b and the ends of the cells 206 adjoining the end face 202a are left unplugged. The material of the plugs 204p, 206p may be a mixture of ceramic material with a binder and a plasticizer. The walls 202c are porous after firing. The thickness and porosity of the walls 202c after firing are such that the structural integrity of the honeycomb structure 202 is not compromised. For diesel exhaust filtration, the porous walls 202c may incorporate pores having mean diameters in the range of 1 to 60 µm, more preferably in a range from 5 to 50 µm.

The system 200 includes a holder 208 which supports the honeycomb structure 202. The system 200 further includes a gas conditioner 210 positioned below the end face 202a of the honeycomb structure 202. The term "gas conditioner" is intended to cover any device that can modify and regulate the temperature of a gas. The gas conditioner 210 includes an inlet 210a wherein gas 212 enters the conditioner 210 and an outlet 210b wherein gas 212 exits the conditioner. The temperature of the gas 212 exiting the conditioner 210 may be increased or decreased in comparison to the temperature of the gas 212 entering the conditioner 210. Typically, the gas 212 is simply air. However, other types of gases, such as inert gases or gases that would not interact chemically with the honeycomb structure, may also be used. The gas conditioner 210 typically includes a fan for directing the gas 212 at the end face 202a of the honeycomb structure 202. The gas 212 directed at the end face 202a of the honeycomb structure 202 enters the honeycomb structure 202 through the open cells 206. The gas 212 directed at the end face 202a of the honeycomb structure 202 may also enter the cells 204 if there are defects in the plugs 204p inserted in the cells 204. The gas 212 entering the cells 206 propagate up the honeycomb structure 202. The gas 212 will emerge at the end face 202b if there are defects, such as holes and cracks, in the walls 202c defining the cells 204, 206 or if there are defects in the plugs 204p, 206p inserted in the ends of the cells 204, 206, respectively.

Figure 2B:
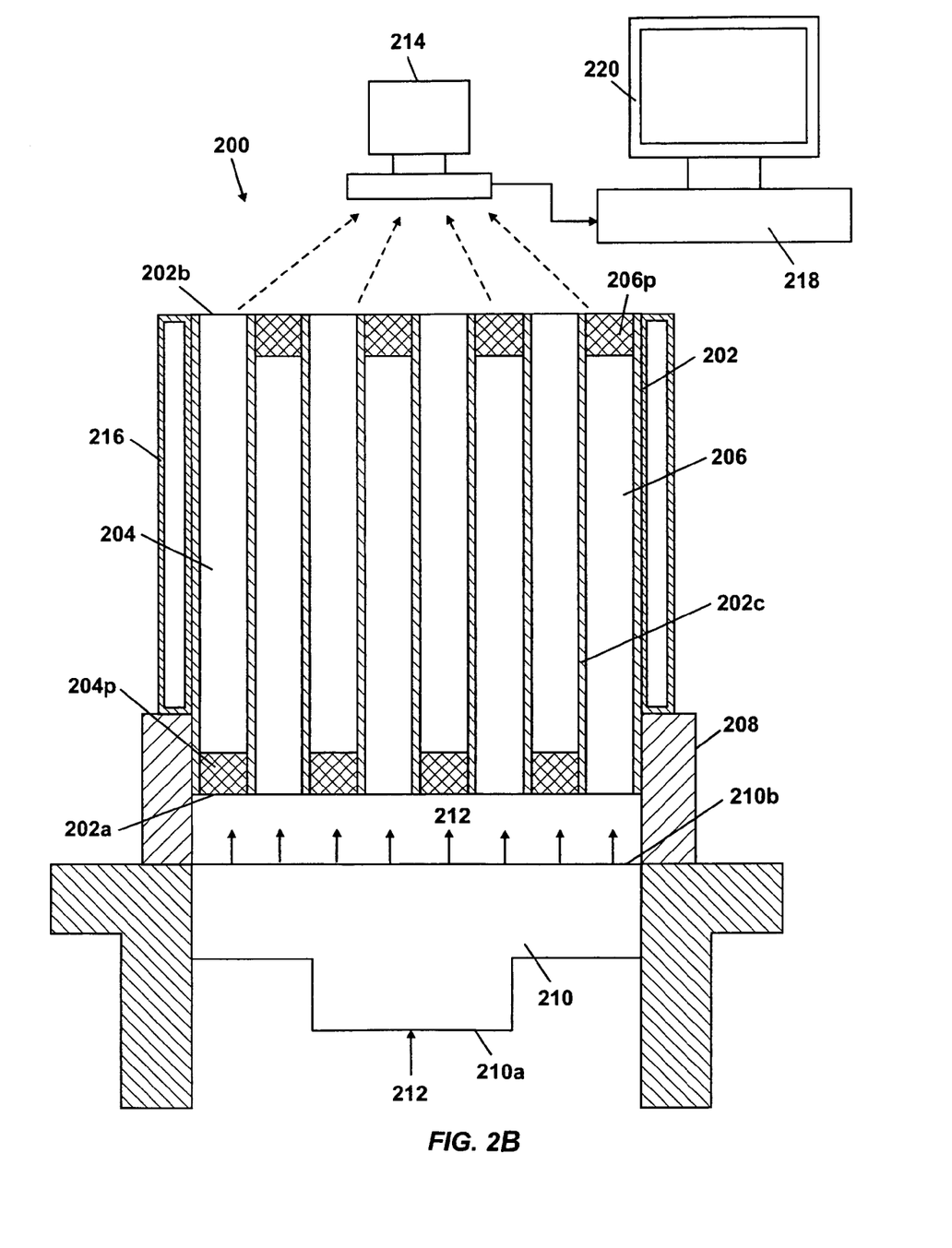
FIG. 2B illustrates a system for detecting leaks in a plugged honeycomb structure according to another embodiment of the invention.

The system 200 further includes an infrared detector 214 supported above the honeycomb structure 202a. The infrared detector 214 is used to observe the temperature distribution at the end face 202b. The temperature distribution at the end face 202b will appear uniform if there are no leaks in the honeycomb structure 202. If there are leaks in the honeycomb structure 202, the gas 212 will emerge at the end face 202b as previously discussed and will appear as thermal spots, either hot or cold, in the temperature distribution. Eventually, the temperature of the honeycomb structure 202 will be at equilibrium with the temperature of the gas 212 passed into the honeycomb structure 202 and the temperature distribution at the end face 202*b* will again appear uniform. The time it takes for the temperature of the honeycomb structure 202 to be at equilibrium with the temperature of the gas 212 can be determined experimentally and used to determine when thermal spots due to leaks or defects can appear in the temperature distribution at the end face 202*b*. As shown in FIG. 2B, the holder 208 could include an inflatable bladder 216 (or other insulating medium) that would seal off the exterior of the honeycomb structure 202 so that the surrounding temperature has limited influence on the temperature distribution at the end face 202*b*.

All objects emit infrared radiation. The higher the temperature of an object, the higher the radiant energy emitted at all wavelengths. The infrared detector 214 detects infrared emissions from the end face 202*b*. The infrared detector 214 could simply be infrared goggles. An operator can observe infrared emissions from the end face 202*b* through the infrared goggles and mark the locations on the end face 202*b* emitting at a different intensity than the remainder of the end face 202*b*. Preferably, the infrared detector 214 is an infrared imaging device, such as an infrared imaging camera, that can generate or capture images representing the temperature distribution at the end face 202*b*. One example of a 2D infrared imaging camera is one sold under the trade name XEVA-USB digital camera by Xenics, Lexington, Mass. A Hi8 camcorder, such as available from Sony Corporation, is another example of a device that may be used for infrared imaging. The advantage of using an infrared imaging device is that observation of the temperature distribution and marking of the locations on the end face 202*b* having thermal spots can be done automatically and precisely.

Figure 3:
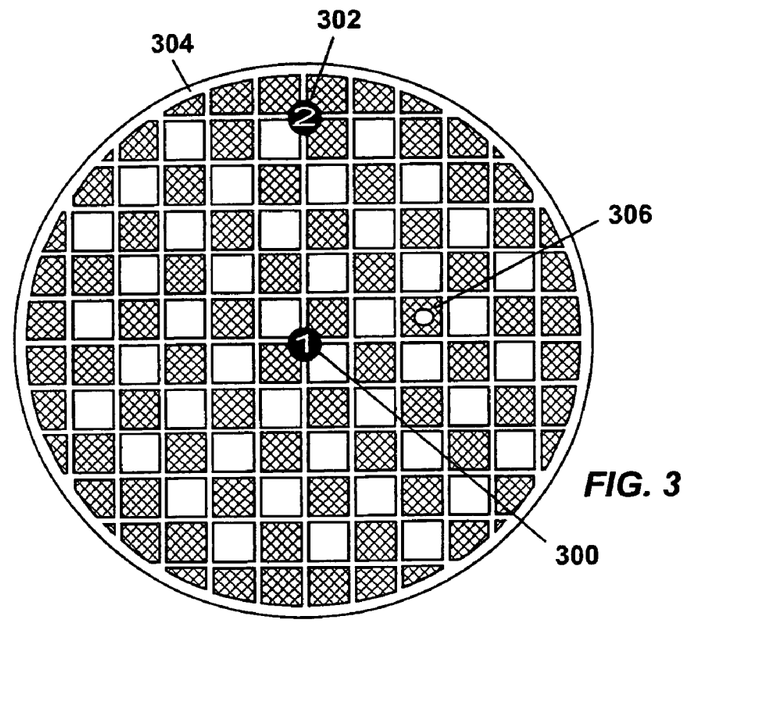
FIG. 3 illustrates marking of a honeycomb structure according to one embodiment of the invention.

The infrared detector 214 may be coupled to a processor 218. In one embodiment, the infrared detector 214 captures an image representative of infrared emissions from the end face 202*b* of the honeycomb structure and sends the image to the processor 218. In one embodiment, the processor 218 includes an application that takes the image from the infrared detector 214 as input. The application may render a visual representation of the image on a monitor 220. In one example, an operator then inspects the visual representation to determine if there are thermal spots that would indicate that the honeycomb structure 202 contains defective cells. The operator may obtain a printout of the visual representation, match the printout to the end face 202*b*, and mark the location of the thermal spots on the end face 202*b* using, for example, index pins. To facilitate this, it is desirable to provide reference markers on the end face 202*b* which could also appear on the printout. FIG. 3 shows two reference markers 300, 302 provided on an end face 304 of a honeycomb structure, one at the center of the end face 304 and the other a couple of cells away from the center of the end face 304. Coordinates of defective cells, such as cell 306, could be provided relative to these markers. Returning to FIG. 2A, in another example, the application executed by the processor 218 generates coordinates of thermal spots in the image and reports such coordinates and/or uses such coordinates to control a robot system to mark the defective cells in the honeycomb structure 202. After marking, the defective cells may be repaired.

Figure 4A:
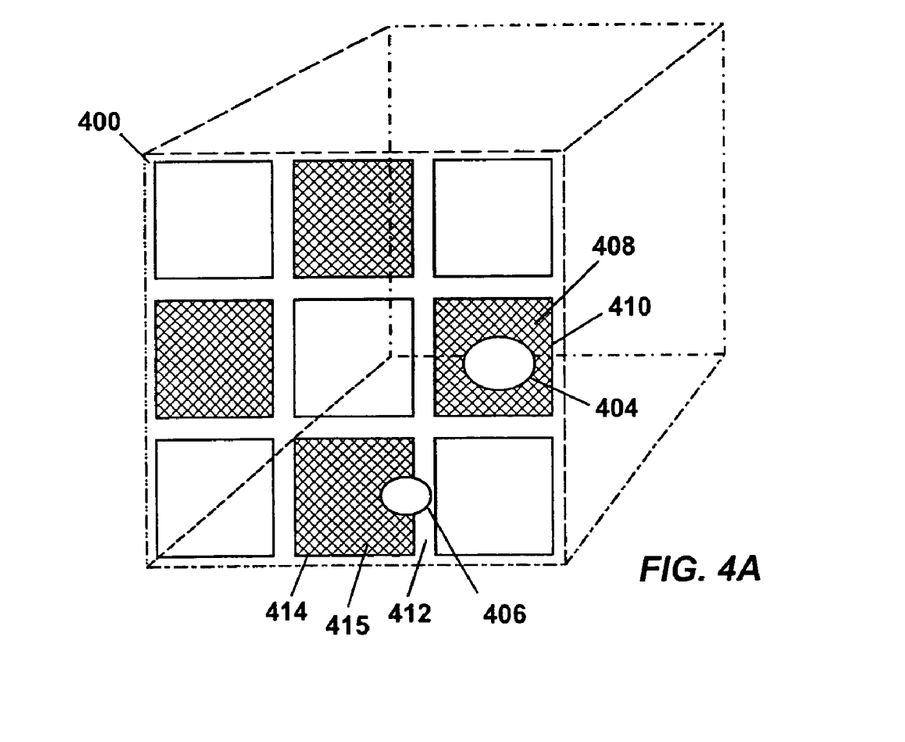
FIG. 4A shows a honeycomb cell structure having defects.
Figure 4B:
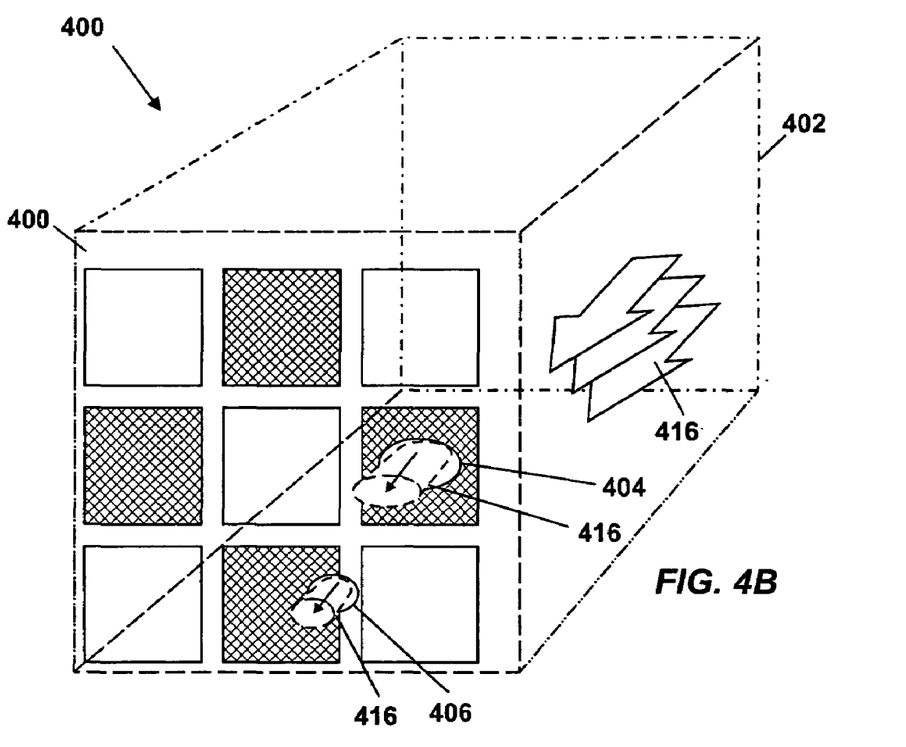
FIG. 4B shows gas emerging from defective cells in the honeycomb cell structure of FIG. 4A according to one embodiment of the invention.
Figure 4C:
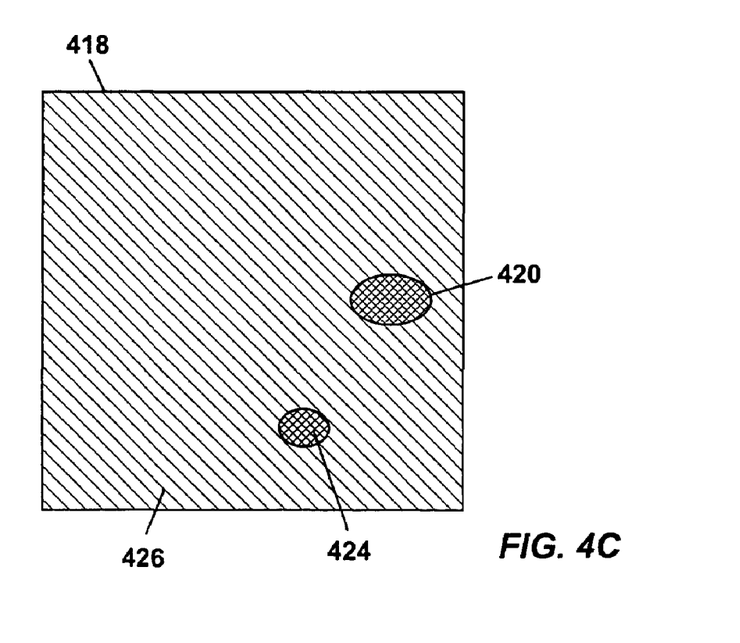
FIG. 4C shows a visual representation of infrared emissions from the honeycomb structure of FIG. 4B according to one embodiment of the invention.

For illustration purposes, FIG. 4A shows a partial view of an end face 400 of a honeycomb structure having defects 404, 406. In the example shown, the defects 404, 406 appear in the end face 400, but this may not necessarily be the case in all honeycomb structures. That is, the defects could appear anywhere in the honeycomb structure, for example, in the interior of the honeycomb structure. However, it is convenient for illustration purposes to show the defects in the end face 400. The defect 404 is located in a plug 408 formed in a cell 410. The defect 406 overlaps a wall 412 defining cell 414 and a plug 415 inserted in the cell 414. FIG. 4B shows gas 416 (applied at the opposite end face 402 of the honeycomb structure) emerging from the defects 404, 406 on the end face 400. The gas 416 forms hot or cold spots at the locations of the defects 404, 406. FIG. 4C shows a visual representation 418 of the infrared emissions (temperature distribution) at the end face 400. The cross-hatched regions 420, 424 represent the thermal spots corresponding to the defects (404, 406 in FIGS. 4A and 4B). The hatched region 426 represents a relatively uniform temperature distribution.

Figure 5:
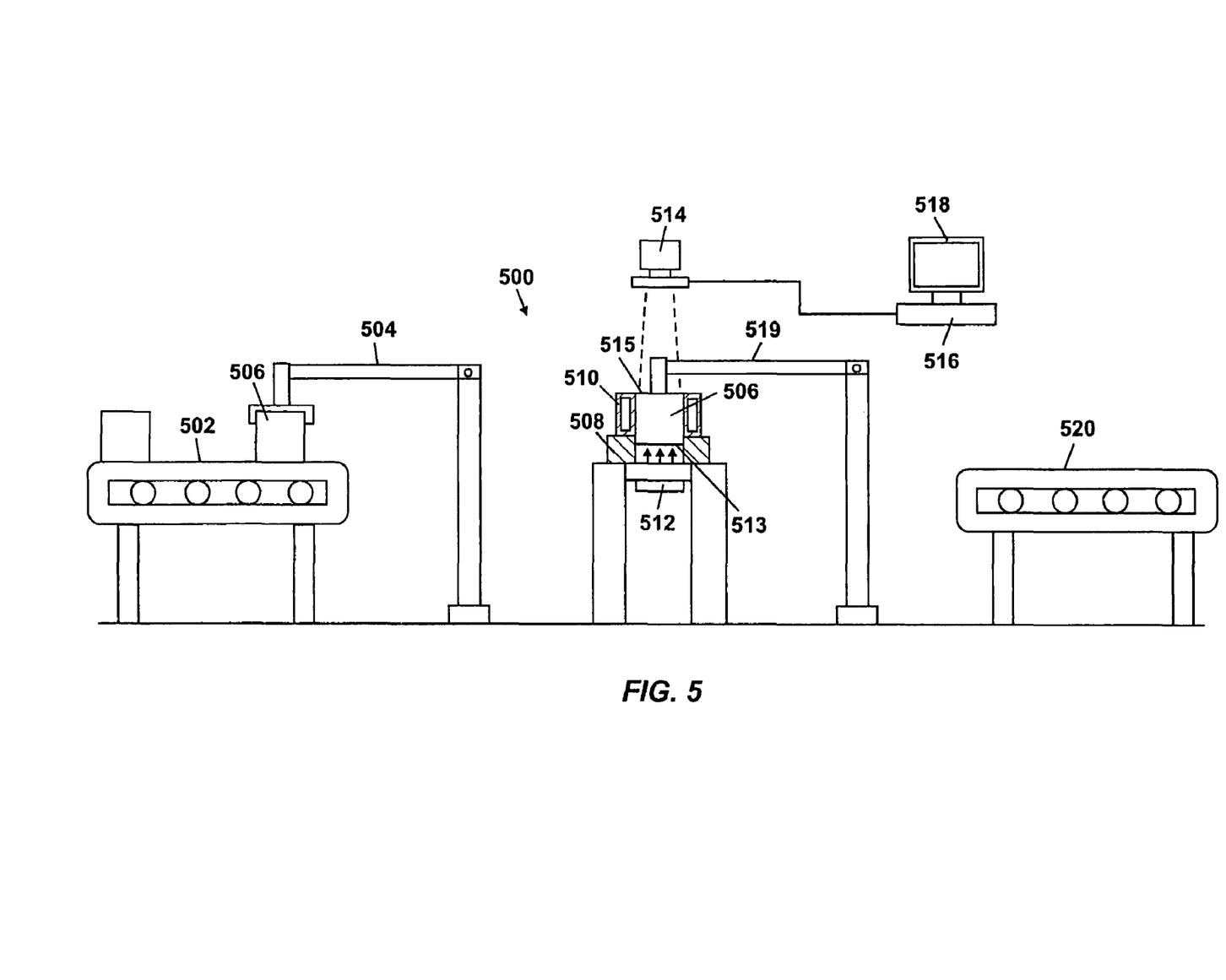
FIG. 5 illustrates an automated system for detecting leaks in a plugged honeycomb structure according to one embodiment of the invention.

FIG. 5 illustrates an automated system 500 for detecting leaks or defects in a honeycomb structure according to one embodiment of the invention. The automated system 500 includes a conveyor belt 502 that transports honeycomb structures to a robotic arm 504. The robotic arm 504 picks a honeycomb structure 506 from the conveyor belt 502 and positions the honeycomb structure 506 in a holder 508, which may be equipped with an inflatable bladder 510 that would seal off the exterior of the honeycomb structure 506. A gas conditioner 512 is positioned below the holder 508, and an infrared detector 514 is positioned above the holder 508. The gas conditioner 512 directs gas at an end face 513 of the honeycomb structure 506, and the infrared detector 514 captures an image of infrared emissions (temperature distribution) at the end face 515 of the honeycomb structure 506. The image captured is sent to a processor 516, which generates coordinates of any thermal spots in the temperature distribution at the end face 515 of the honeycomb structure 506 from the image. A visual representation of the image, including the thermal spots, may also be displayed on the monitor 518. The processor 516 uses the coordinates to control a robot arm 519 to mark the defective cells in the honeycomb structure 506. The processor 516 may also control the robot arm 519 to repair the defective cells in the honeycomb structure 506. The robotic arm 519 may pick up and position the honeycomb structure 506 on another conveyor belt 520 after marking or repairing the defects, allowing another honeycomb structure to be processed.

The invention typically provides the following advantages. Use of solid particulates such as graphite for testing is avoided. This eliminates the need to clean the honeycomb structure after testing. The testing can be accomplished quickly. The added step of rotating the honeycomb structure is eliminated. The testing is environmentally friendly in that it does not require the use of toxic materials. The testing is repeatable. The testing requires little human intervention. The testing can be easily automated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting leaks in a plugged honeycomb structure comprising:
    directing a gas at a first end face of the honeycomb structure at a temperature that is different from a temperature of the honeycomb structure;

detecting infrared emissions at a second end face of the honeycomb structure, the infrared emissions being representative of a temperature distribution at a second end face of the honeycomb structure;

the gas being directed at the first end face of the honeycomb structure emerging at the second end face of the honeycomb structure selectively or non-uniformly at locations where the cells in the honeycomb structure are defective, said locations appearing as thermal spots in the temperature distribution; and;

marking the locations where the cells of the honeycomb are defective on the second end face.

2. The method of claim 1, further comprising determining a time at which the temperature of the honeycomb structure would be at equilibrium with the temperature of the gas.

3. The method of claim 2, wherein observing the temperature distribution occurs before the time at which the temperature of the honeycomb structure would be at equilibrium with the temperature of the gas.

4. The method of claim 1, further comprising disposing the honeycomb structure in an insulating medium to limit effect of surrounding temperature on the temperature distribution at the second end face.

5. The method of claim 1, wherein observing the temperature distribution comprises generating an image of the infrared emissions at the second end face.

6. The method of claim 5, wherein the locations in the image where the cells are defective have a different intensity than the remainder of the image.

7. The method of claim 5, further comprising generating a visual representation of the image, wherein the locations where the cells are defective appear as thermal spots in the visual representation.

8. The method of claim 1, further comprising repairing the cells that are defective.

9. The method of claim 1, further comprising providing reference markers on the second end face which aid in marking the locations where the cells are defective.

10. A system for detecting leaks in a plugged honeycomb structure comprising:

a holder which supports the honeycomb structure;

a gas conditioner positioned to direct gas at a first end face of the honeycomb structure at a temperature that is different from a temperature of the honeycomb structure;

an infrared detector positioned to detect infrared emissions at a second end face of the honeycomb structure, the infrared emissions being representative of a temperature distribution at the second end face of the honeycomb structure; and means for marking defective cells in the honeycomb structure based on an output of the infrared detector.

11. The system of claim 10, wherein the infrared detector comprises infrared goggles.

12. The system of claim 10, wherein the infrared detector comprises an infrared imaging device.

13. The system of claim 10, wherein the holder comprises an inflatable bladder for sealing off an exterior of the honeycomb structure.

14. The system of claim 10, further comprising a processor which receives signals representative of the temperature distribution at the second end face of the honeycomb structure from the infrared detector.

15. The system of claim 14, wherein the processor generates a visual representation of the temperature distribution.

16. The system of claim 14, wherein the processor generates coordinates of defective cells in the honeycomb structure based on the temperature distribution.

17. The system of claim 10, further comprising means for transporting honeycomb structures to the vicinity of the holder.

18. The system of claim 17, further comprising means for placing the honeycomb structure in the holder.

* * * * *